United States Patent [19]
Amano

[11] Patent Number: 5,267,252
[45] Date of Patent: Nov. 30, 1993

[54] SOLID-STATE LASER DEVICE COMPRISING A TEMPERATURE-CONTROLLED THERMAL CONDUCTIVE SUPPORT

[75] Inventor: Sho Amano, Tokyo, Japan

[73] Assignee: Hoya Corporation, Tokyo, Japan

[21] Appl. No.: 936,045

[22] Filed: Aug. 26, 1992

[30] Foreign Application Priority Data

Aug. 30, 1991 [JP] Japan .......................... 3-069401[U]

[51] Int. Cl.⁵ .............................................. H01S 3/04
[52] U.S. Cl. ........................................ 372/34; 372/36; 372/71; 372/75
[58] Field of Search ....................... 372/75, 69, 70, 71, 372/34, 36

[56] References Cited

U.S. PATENT DOCUMENTS

| | | | |
|---|---|---|---|
| 4,653,056 | 3/1987 | Baer et al. | 372/71 |
| 5,068,865 | 11/1991 | Ohshima et al. | 372/36 |
| 5,181,214 | 1/1993 | Berger et al. | 372/34 |

FOREIGN PATENT DOCUMENTS

| | | | |
|---|---|---|---|
| 0084480 | 3/1992 | Japan | 372/75 |
| 0134326 | 5/1992 | Japan | 372/36 |

*Primary Examiner*—Georgia Y. Epps
*Attorney, Agent, or Firm*—Ladas & Parry

[57] ABSTRACT

In a solid-state laser device which emits an output laser beam by pumping a solid-state laser medium in a laser resonator by an excitation laser beam generated from a semiconductor laser unit, both the solid-state laser medium and the laser resonator are mounted on a common thermal conductive support which is thermally controlled by a temperature controller through a Peltier effect element to keep a temperature of the thermal conductive support substantially constant. A thermistor is attached to the thermal conductive support to detect the temperature of the support and to supply the temperature controller with a temperature detection signal representative of the temperature of the support. The temperature controller carries out proportional-plus-integral-plus-derivative control to supply a control signal to the Peltier effect element.

7 Claims, 7 Drawing Sheets

SOLID-STATE LASER DEVICE COMPRISING A TEMPERATURE-CONTROLLED THERMAL CONDUCTIVE SUPPORT

BACKGROUND OF THE INVENTION

This invention relates to a solid-state laser device for use in emitting an output laser beam by pumping a solid-state laser medium by a semiconductor laser unit.

In a conventional solid-state laser device of the type described, a solid-state laser medium, such as Nd:YAG, is arranged in a laser resonator and pumped by an excitation laser beam to generate an oscillation laser beam. The oscillation laser beam is emitted through the laser resonator as an output laser beam. Specifically, the solid-state laser medium has an optical axis, a pair of end surfaces transverse to the optical axis, and a side surface contiguous to the end surfaces along the optical axis. The solid-state laser medium may be pumped by the excitation laser beam from either at least one of the end surfaces or the side surface of the solid-state laser medium. The excitation laser beam is usually generated by a laser diode.

In addition, it often happens that a wavelength conversion element, such as KTP, is located inside or outside of the laser resonator so as to emit the output laser beam which has a wavelength different from that of the oscillation laser beam. This structure enables oscillation of a blue or a green laser beam. Herein, an optical element, such as a wavelength conversion element, will be generally called an optical function element.

In the meantime, it is a recent trend that such a solid-state laser device is applicable to a wide variety of equipments and that strict limitations are very often imposed on a laser characteristic, such as intensity of the output laser beam, and any other optical characteristics related to a longitudinal mode, a transverse mode, and beam pointing. At any time, the output laser beam should be strictly stabilized in the solid-state laser device.

However, it has been found out that the conventional solid-state laser device can not completely satisfy all of the above-mentioned optical characteristics. This is because the solid-state laser medium and the laser resonator can not be completely regulated or controlled about a temperature in the conventional solid-state laser device.

For example, disclosure is made by Barer et al in U.S. Pat. No. 4,653,056 about an Nd-YAG laser which comprises a laser diode, an Nd:YAG laser rod, a frequency doubler, such as a KTP, and a laser resonator, all of which are housed in a housing and which will be referred to as optical components hereinunder. In addition, a Peltier cooler is also arranged in the housing and is connected to a temperature control circuit to control a temperature of the laser diode. However, it is to be noted here that only the temperature of the laser diode is controlled by the Peltier cooler and the temperature control circuit, independently of the other optical components. This makes temperature control of a whole of the Nd:YAG laser insufficient or incomplete.

SUMMARY OF THE INVENTION

It is an Object of this invention to provide a solid-state laser device which is capable of satisfying strict limitations related to optical characteristics.

It is another object of this invention to provide a solid-state laser device of the type described, which can sufficiently control a temperature of the solid-state laser device.

A solid-state laser device to which this invention is applicable is for use in emitting an output laser beam by pumping a solid-state laser medium in a laser resonator by an excitation laser beam generated from a semiconductor laser unit. According to this invention, the solid-state laser device comprises a thermal conductive support which supports both of the solid-state laser medium and the laser resonator and temperature control means electrically connected to the thermal conductive support for controlling a temperature of the thermal conductive support to keep the thermal conductive support at a predetermined temperature and to stabilize oscillation of the solid-state laser medium.

BRIEF DESCRIPTION OF THE DRAWING

FIG. 1 (A) shows a sectional view of a solid-state laser device according to a first embodiment of this invention;

FIG. 1 (B) shows a block diagram of a temperature controller applicable to the solid-state laser device of this invention;

DESCRIPTION OF THE PREFERRED EMBODIMENTS

Referring to FIG. 1 (A), a solid-state laser device according to a first embodiment of this invention is for use in responding to an excitation laser beam Le to emit an output laser beam Lo. The solid-state laser device comprises a heat sink 11 of a thermal conductive material, such as copper, brass, iron, stainless, aluminum, Invar, or the like, and a semiconductor laser unit 12 mounted on the heat sink 11 to generate the excitation laser beam Le along an optical axis depicted at a broken line in FIG. 1. The excitation laser beam Le is focused or converged by a condenser lens 13 and incident into an oscillation block 15 pumped by the excitation laser beam Le.

The illustrated oscillation block 15 comprises an adiabatic housing 16 which has an inlet window, an outlet window, and a hollow space defined therein and which may be formed, for example, by copper, brass, iron, stainless, aluminum, Invar, or the like. In addition, the illustrated housing 16 has a bottom portion partially opened to define an opening, a ceiling portion, and a pair of side walls contiguous to both the bottom and the ceiling portions. The bottom portion of the housing 16 is thermally tightly brought in contact with the heat sink 11 with a Peltier effect element 17 packed into the opening of the bottom portion, as illustrated in FIG. 1. On the side walls, the inlet and the outlet windows are positioned along the optical axis and are opposite to each other. The excitation laser beam Le is incident through the inlet window into the oscillation block 15 and is emitted through the outlet window in the form of the output laser beam Lo.

In the hollow space of the adiabatic housing 16, a thermal conductive support 18 is placed within the hollow space and is kept contact with the bottom portion of the housing 16 and the Peltier effect element 17. The thermal conductive support 18 may be a substrate of a thermal conductive metal material, such as copper, brass, iron, stainless, aluminum, Invar, and may be called a thermal conductive substrate.

On the thermal conductive support 18, a solid-state laser medium 20 of a rod shape is arranged along the optical axis of the excitation laser beam Le. The solid-state laser medium 20 has first and second end surfaces directed leftwards and rightwards of FIG. 1, respectively, and a side surface contiguous to the first and the second end surfaces. The solid-state laser medium 20 is implemented by an Nd:YAG laser rod which has a diameter of 3 millimeters, a length of 5 millimeters, and which exhibits an optical absorption peak wavelength of 807 nm at a room temperature. The solid-state laser medium 20 can generate an oscillation laser beam L1 which has a wavelength of 1064 nm and which may be called a fundamental wavelength laser beam. In this connection, the illustrated solid-state laser medium 20 is pumped by the excitation laser beam Le of 807 nm. The oscillation laser beam L1 is generated along an optical axis which is coincident with that of the excitation laser beam Le in the illustrated example when excited by the excitation laser beam Le. Thus, the excitation and the oscillation laser beam Le and L1 have a common optical axis. Incidentally, a degree of convergence of the excitation laser beam Le is selected so that a mode volume of the excitation laser beam Le is substantially matched with a mode volume of the oscillation laser beam L1.

More specifically, a dielectric multi-layer 21 is deposited on the first end surface of the solid-state laser medium 20 as a selective reflection layer and may be formed by a plurality of dielectric films. The dielectric multi-layer 21 serves as a part of a laser resonator as will become clear later and exhibits a transmittance not lower than 90% for the excitation laser beam Le of 807 nm and a reflectance not lower than 99.9% for the oscillation laser beam L1 of 1064 nm. On the other hand, an antireflection layer (not shown) is deposited on the second end surface of the solid-state laser medium 20 and has a reflectance which is smaller than 0.5% for the oscillation laser beam L1.

In FIG. 1, an output mirror 24 is adjacent to the outlet window of the housing 16 to form the laser resonator in combination with the dielectric multi-layer 21 coated on the first end surface of the solid-state laser medium 20. The illustrated output mirror 24 is formed by a concave lens of glass having a concave surface directed towards the solid-state laser medium 20. The concave surface is coated with a dielectric reflection multi-layer which has a reflectance not lower than 99.9% for the oscillation laser beam L1 and a transmittance not lower than 90% for a secondary oscillation laser beam L2 which has a second harmonic wavelength of 532 nm, as will later be described. In addition, the concave surface has a radius of curvature equal to 100 millimeters. In the illustrated laser resonator, a distance between the output mirror 24 and the dielectric multi-layer 21 may be called a resonator length and is equal to 25 millimeters.

In the illustrated example, a wavelength conversion element 26 and a quarter wavelength plate 27 are arranged as optical function elements between the solid-state laser medium 20 and the output mirror 24 along the optical axis of the oscillation laser beam L1 and will be referred to as first and second optical function elements, respectively. The illustrated wavelength conversion element 26 is formed by a KTP crystal which has a length of 5 millimeters. Specifically, the KTP crystal is cut so that a crystal cut angle $\theta$ is equal to 90 and $\phi$ is equal to 26 or 23, where $\phi$ represents an angle of the optical axis relative to a Z-axis of the crystal and $\theta$, an angle between an X-axis and a projection of the optical axis on a crystal plane defined by X- and Y-axies. Such a KTP crystal satisfies a phase match condition at a room temperature and produces a green laser beam L2 of a wavelength of 532 nm in response to the oscillation laser beam L1 of 1064 nm generated by the solid-state laser medium 20. Thus, the wavelength conversion element 26 serves to convert the wavelength of the oscillation laser beam L1 into a half wavelength of 532 nm. The green laser beam L2 may be named an intermediate laser beam and is specified by a second harmonic wave of the oscillation laser beam L1. The intermediate laser beam L2 is given to the quarter wavelength plate 27 to remove a noise included in the intermediate laser beam L2 resulting from conflict among polarization modes and to produce a noise-free laser beam as the output laser beam Lo through the output mirror 24

It is to be noted here that the quarter wavelength plate 27 may replaced by an etalon plate which is operable to eliminate a noise from the intermediate laser beam L2 by unifying longitudinal modes and by suppressing conflict among the longitudinal modes.

At any rate, both of the first and the second optical function elements are mounted on the thermal conductive plate 18 together with the solid-state laser medium 20 and the laser resonator formed by the dielectric multi-layer 21 and the output mirror 24. In other words, the solid-state laser medium 20, the first and the second optical elements 26 and 27, the output mirror 24 are arranged on the thermal conductive support 18 in common and have a common optical axis. Thus, the solid-state laser medium 20, the optical function elements 26 and 27, and the laser resonator are fixed on the thermal conductive support 18 with desired positions kept among them.

Herein, it should be recollected that the Peltier effect element 17 is packed into the bottom of the adiabatic housing 16 and acts as a Peltier cooler.

In FIG. 1., the Peltier effect element 17 is connected to a temperature controller 30 which is coupled to a thermistor 31 embedded in the thermal conductive support 18. The thermistor 31 detects a temperature of the thermal conductive support 18 and produces a temperature detection signal representative of the temperature of the thermal conductive support 18. Supplied with the temperature detection signal, the temperature controller 30 supplies the Peltier effect element 17 with a temperature control signal to keep the thermal conductive support 18 at a predetermined temperature selected between 15 C. and 40 C. Specifically, such temperature control can be carried out at a control precision which falls within a range of 0.1 C. The temperature controller 30 controls the thermal conductive support 18 so that the temperature of the thermal conductive support 18 becomes equal to a temperature at which the output laser beam Lo is stabilized in its level. In the illustrated example, the thermal conductive support 18 is kept at the temperature of 25 C. so as to stabilize a laser beam characteristic.

Herein, let an initial or reference temperature To of 25 C. be set in the temperature controller 30. In this event, a detection temperature of the thermistor 31 is assumed to be represented by T1. Under the circumstances, the temperature controller 30 produces the control signal to drive the Peltier effect element 31 so that a difference between the initial temperature To and the detection temperature T1 is rendered equal to zero. Thus, the thermal conductive support 18 is substantially kept at the initial or reference temperature To.

Referring to FIG. 1(B), the temperature controller 30 is supplied from the thermistor 31 with the temperature detection signal representative of the detection temperature T1 to send the control signal to the Peltier effect element 17, as mentioned in conjunction with FIG. 1(A). More particularly, the temperature controller 30 carries out proportional-plus-integral-plus-derivative control to render the difference between the reference temperature To and the detection temperature T1 equal to zero in a known manner. To this end, the illustrated temperature controller 30 comprises a correction circuit 301 supplied with the temperature detection signal to produce a corrected temperature signal, a reference voltage circuit 302 for producing a reference voltage signal representative of the reference or initial temperature, and a difference calculation circuit 303 for calculating a difference between the corrected temperature signal and the reference voltage signal to produce a difference signal representative of a difference between the corrected temperature signal and the reference temperature signal. Herein, the temperature detection signal is linearly compensated or corrected by the correction circuit 301 in a known manner. It may be said that the reference voltage source 302 equivalently holds the reference or the initial temperature.

The difference signal is delivered to a proportional control circuit 304, an integral control circuit 305, and a derivative control circuit 306 which carry out proportional, integral, and derivative control actions in known manners to produce first, second, and third correction signals, respectively. At any rate, the first correction signal is proportional to the difference signal while the second and the third correction signals are representative of an integral value and a derivative value of the difference signal. The first through the third correction signals are linearly combined with one another by a sum circuit 307 to be supplied to a current amplifier 308 as a combined signal. The combined signal is amplified by the current amplifier 308 to be sent to the Peltier effect element 17 as the control signal.

With this structure, the excitation laser beam Le is focused through the condenser lens 13 to be incident onto the solid-state laser medium 20, As a result, the solid-state laser medium 20 is pumped by the excitation laser beam Le to generate the oscillation laser beam L1 through the second end surface thereof. The oscillation laser beam L1 has the fundamental wavelength and is confined in the laser resonator structured by the dielectric multi-layer 21 and the output mirror 24. Such a confined oscillation laser beam L1 is allowed to pass through the wavelength conversion element 26 to be converted into the intermediate laser beam L2 of the second harmonic wave. The intermediate laser beam L2 is successively passed through the quarter wavelength plate 27 and the output mirror 24 to be produced as the output laser beam Lo.

According to the inventor's experimental studies, it has been confirmed that the output laser beam Lo has an oscillation output of 15 milliwatts and an RMS noise which is less than 1% and which specifies an output stability even when ambient temperature has been irregularly varies. In addition, the output laser beam Lo has exhibited stable longitudinal and transverse modes.

Figure 1A:
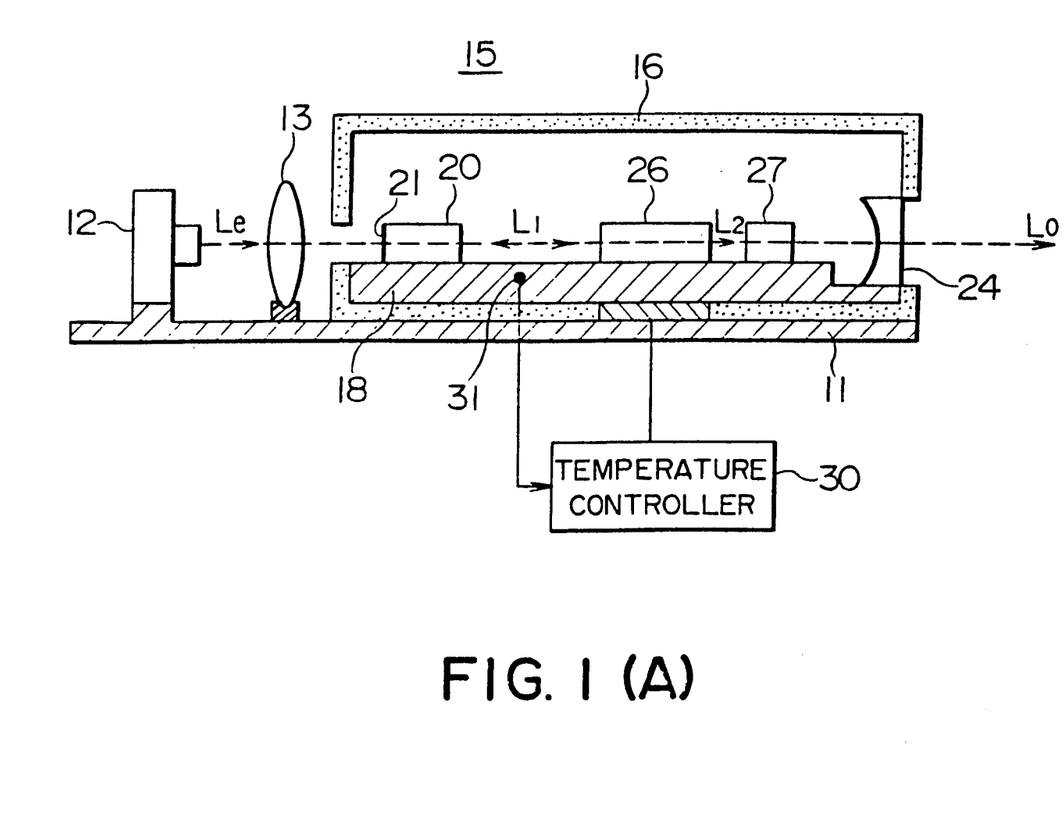
Figure 2:
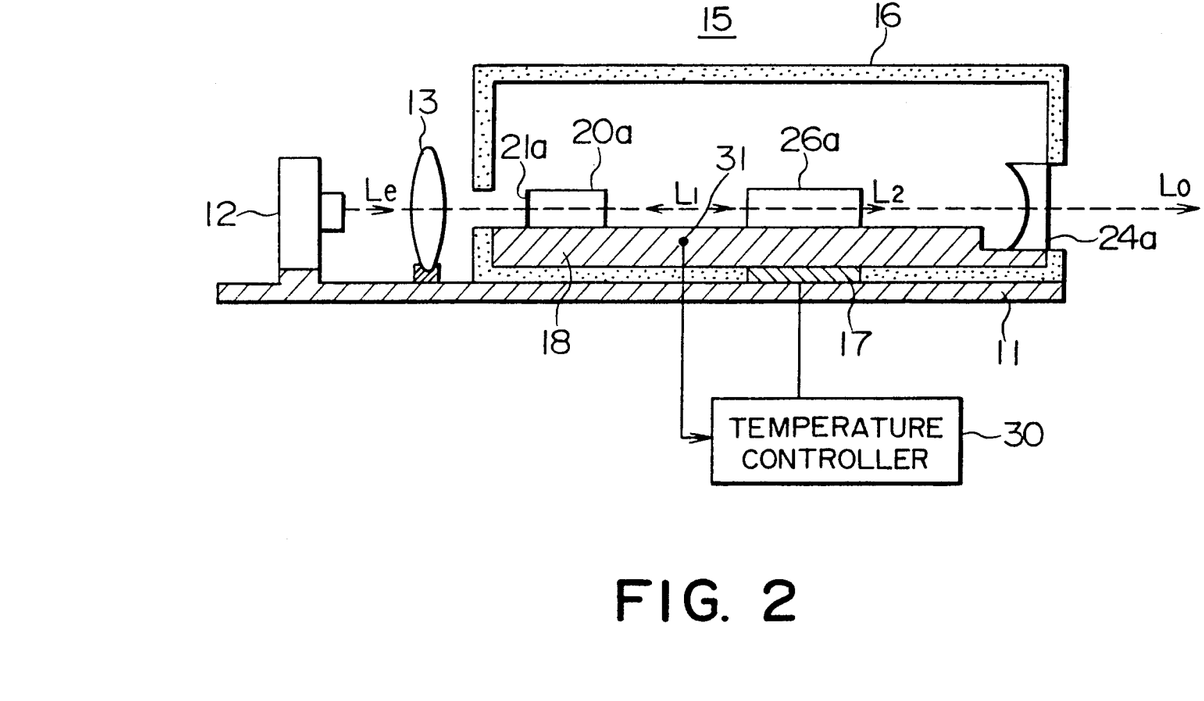
FIG. 2 shows a similar view of a solid-state laser device according to a second embodiment of this invention.

Referring to FIG. 2, a solid-state laser device according to a second embodiment of this invention is similar in structure to that illustrated in FIG. 1 except that the wavelength conversion element 27 (FIG. 1) is removed from FIG. 2. However, the illustrated solid-state laser device is suitable for generating, as the output laser beam Lo, a blue laser beam having a wavelength of 473 nm, which differs from that illustrated in FIG. 1. In this connection, the solid-state laser medium, the wavelength conversion element, the dielectric multi-layer, and the output mirror have optical characteristics different from those illustrated in FIG. 1 and are therefore depicted at 20a, 26a, 21a, and 24a in FIG. 2, respectively. Like in FIG. 1, the quarter wavelength plate 27 or the etalon plate may be located in the laser resonator in FIG. 2 also.

More specifically, the solid-state medium 20a is implemented by an Nd:YAG laser rod which has a length of 1 millimeter, first and second end surfaces directed implemented by an Nd:YAG laser rod which has a length of millimeter, first and second end surfaces directed lefthand and righthand sides of FIG. 2, respectively, and a side surface contiguous to the first and the second end surfaces and which can generate an oscillation laser beam L1 of a wavelength of 946 nm. Both of the first and the second end surfaces are subjected to a mirror finish. Furthermore, the illustrated solid-state laser medium 20a has an optical absorption peak wavelength equal to 807 nm like in FIG. 1. This means that the semiconductor laser unit 12 may be identical with that illustrated in FIG. 1 and therefore generate the excitation laser beam Le of the wavelength of 807 nm.

On the other hand, the dielectric multi-layer 21a should transmit the excitation laser beam Le of 807 nm and reflect the oscillation laser beam L1 of 946 nm. Therefore, the dielectric multi-layer 21a exhibits a reflectance not lower than 99.9% for the oscillation laser beam L1 (=946 nm) and a transmittance not lower than 90% for the excitation laser beam Lo (=807 nm). Such a dielectric multi-layer 21a can be readily formed by depositing a plurality of dielectric films in a known manner.

The output mirror 24a has a concave surface which is directed towards the solid-state laser medium 20a and which has a radius of curvature identical with that illustrated in FIG. 1. The concave surface is coated with a dielectric multi-layer which has a reflectance not lower than 99.9% for the oscillation laser beam L1 and which has a transmittance not lower than 90% for a secondary oscillation laser beam L2 which has a second harmonic wavelength of 473 nm. The distance between the dielectric multi-layer 21a and the output mirror 24a may be similar to that illustrated in FIG. 1.

The illustrated wavelength conversion element 26a is structured by a $KNbO_3$ crystal which has a length of 5 millimeters and a crystal cut angle defined by ($\theta = 90.0°$ and $\phi = 60.4°$) or ($\theta = 30.4°$ and $\phi = 90.0°$). It is possible to generate the blue laser beam of 473 nm by allowing the oscillation laser beam L1 of 946 nm to pass through the wavelength conversion unit 26a. The above-mentioned crystal satisfies a phase match condition.

In the illustrated example, the temperature controller 30 is given the temperature detection signal from the thermistor 31 which is attached to the thermal conductive support 18 to measure the temperature, like in FIG. 1. The Peltier effect element 17 is controlled by the temperature controller 30 to keep the thermal conductive support 18 at a predetermined temperature of, for example, 25° C.

According to this solid-state laser device illustrated in FIG. 2, it has been possible to generate the blue laser beam which has had the oscillation output of 10 milliwatts and the RMS noise less than 1%, regardless of a variation of an ambient temperature. The blue laser beam has had stable longitudinal and transverse modes.

Figure 3:
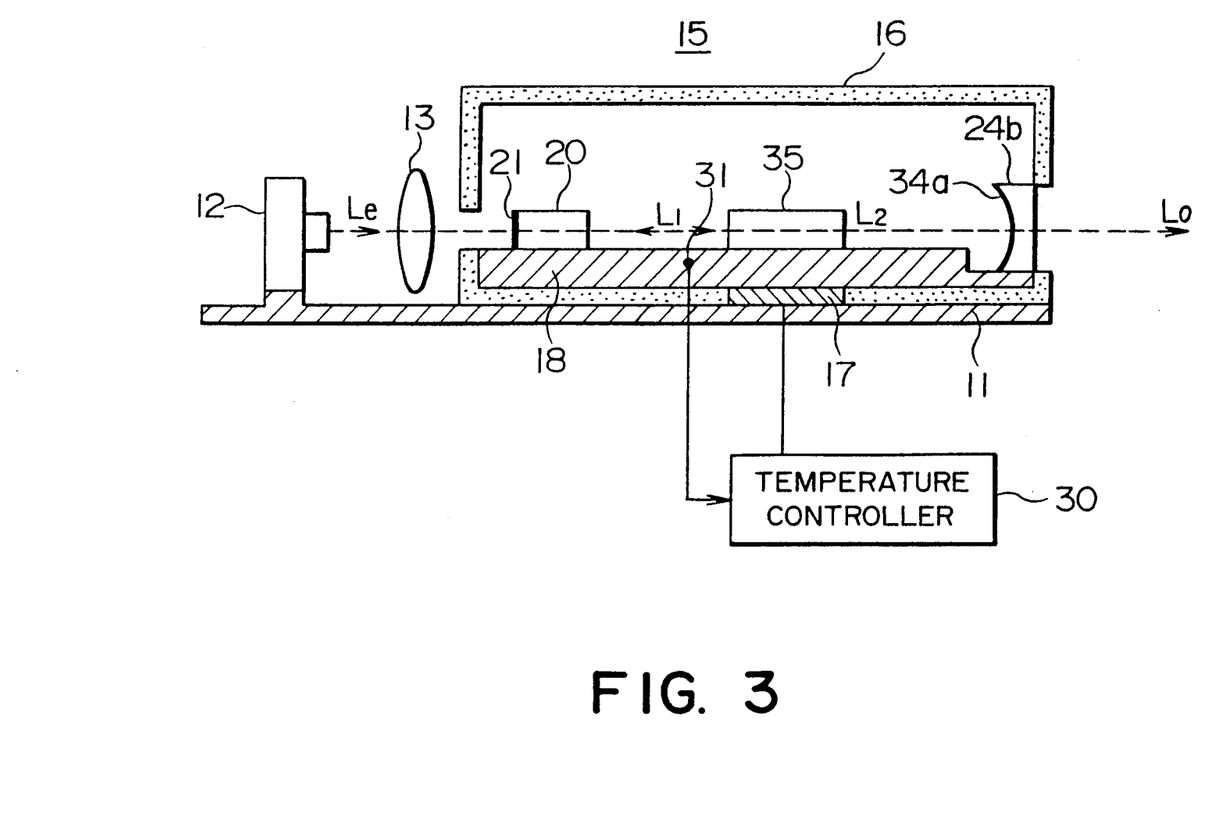
FIG. 3 shows a sectional view of a solid-state laser device according to a third embodiment of this invention.

Referring to FIG. 3, a solid-state laser device according to a third embodiment of this invention is similar in structure and operation to that illustrated in FIG. 1 except that a Q switch element 35 is located on the thermal conductive support 18 as the optical function element in lieu of a combination of the wavelength conversion element 26 and the quarter wavelength plate 27 illustrated in FIG. 1. The Q switch element 35 is implemented by an acoustooptic (AO) element of tellurite glass in the illustrated example. Alternatively, the Q switch element 35 may be either an acoustooptic element of, for example, flint glass, quartz glass, $SiO_2$, $TeO_2$, $LiNbO_3$, or $PbMoO_4$, or an electrooptic Q switch element.

From this fact, it is readily understood that the illustrated solid-state laser device can emit a pulse laser beam as the output laser beam Lo. Herein, it is assumed that the pulse laser beam has a wavelength of 1064 nm. In this connection, the output mirror should have an optical characteristic different from that illustrated in FIG. 1 and is therefore depicted at 24b in FIG. 3. Specifically, the output mirror 24b comprises a concave surface directed to the solid-state laser medium 20 and a reflection layer which is coated on the concave surface and which has a reflectance of 97% for the oscillation laser beam L1. Such a reflective layer can be readily fabricated in a known manner. The radius of curvature of the concave surface and the distance between the dielectric multi-layer 21 and the reflective layer are identical with those illustrated in FIG. 1.

With this structure, it has been possible to generate a stable pulse laser beam which has had pulse energy of 20 microjoules, a pulse stability kept within a range of 3%, and a beam pointing stability restricted to a range of 15 micro radians and which has had stable longitudinal and transerse modes.

Figure 4:
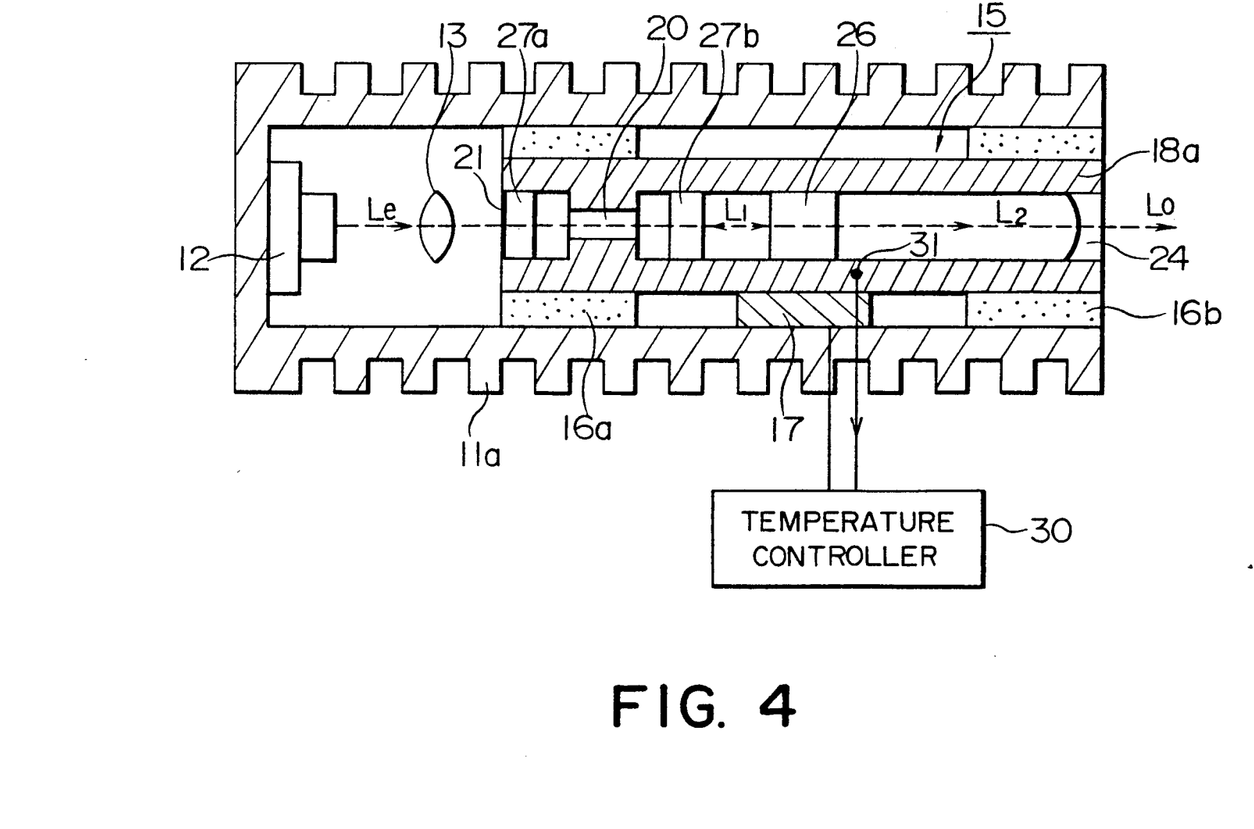
FIG. 4 shows a similar view of a solid-state laser device according to a fourth embodiment of this invention.

Referring to FIG. 4, a solid-state laser device according to a fourth embodiment of this invention comprises similar parts designated by like reference numerals and symbols and is for use in emitting a green laser beam of a single longitudinal mode as an output laser beam Lo along an optical axis depicted at a broken line. In the illustrated example, all of optical elements are accommodated in a hollow space of a cylindrical heat sink which is depicted at 11a and which has a plurality of fins around an outer periphery. The cylindrical heat sink 11 a has a closed lefthand side end and an open righthand side end. The semiconductor laser unit 12 is fixed to the closed lefthand side end while the oscillation block 15 is fitted into the cylindrical heat sink 11a from the righthand side open end with the condenser lens 13 interposed between the semiconductor laser unit 12 and the oscillation block 15.

The illustrated optical block 15 comprises a thermal conductive support 18a of a frame shape, a pair of adiabatic rings 16a and 16b located with a spacing left therebetween along an optical axis, and the Peltier effect element 17 located in the spacing. The adiabatic rings 16a and 16b and the Peltier effect element 17 are placed between the thermal conductive support 18a and the cylindrical heat sink 11a and are thermally and mechanically brought into contact with both the thermal conductive support 18a and the cylindrical heat sink 11a. The thermal conductive support 18a may be formed by a thermal conductive metal, such as copper, brass, iron, stainless, aluminum, or Invar like in FIGS. 1 through 3. Similarly, the adiabatic rings 16a and 16b and the cylinder heat sink 11a may be composed of the same materials as those shown in FIGS. 1 through 3.

The illustrated thermal conductive support 18a has a pair of open end portions, an inner surface defining a cylindrical space of a predetermined diameter, and a strait portion projected from the inner surface to define a narrow space. It is assumed that the solid-state laser medium 20 may be an Nd:YAG rod laser and generates an oscillation laser beam L1 which has a wavelength of 1064 nm of a single longitudinal mode. As shown in FIG. 4, the solid-state laser medium 20 has the first and the second end surfaces which are directed leftwards and rightwards of FIG. 4, respectively, and which are coated with antireflection layers (not shown). Each of the antireflection layers has reflectance which is smaller than 0.5% for the oscillation laser beam L1. The solid-state laser medium 20 is fitted onto the strait portion, as illustrated in FIG. 4.

In FIG. 4, the solid-state laser medium 20 is interposed between first and second quarter wavelength plates 27a and 27b. The first quarter wavelength plate 27a is fitted to one of the open end portions. The dielectric multi-layer or selective reflection layer 21 is deposited on an outer side surface of the first quarter wavelength plate 27a to reflect the oscillation laser beam L1 and to transmit the excitation laser beam Le, like in FIGS. 1 through 3, while an antireflection layer is coated on an inner side surface of the first quarter wavelength plate 27a and may be similar to those coated on the solid-state laser medium 20. The first and the second quarter wavelength plates 27a and 27b are perpendicular to the optical axis. This structure is effective to suppress a spacial hole burning effect.

The above-mentioned dielectric multi-layer 21 which is coated on the first quarter wavelength plate 27a forms a laser resonator along with the output mirror 24 fitted into another open end portion of the cylindrical thermal conductive support 18a, as described in conjunction with FIGS. 1 though 3.

In addition, the wavelength conversion element 26 is placed between the second quarter wavelength plate 27b and the output mirror 24 to convert the oscillation laser beam L1 into an intermediate laser beam L2 having a half wavelength of the oscillation laser beam L1. The wavelength conversion element 26 is fitted to the cylindrical thermal conductive support 18a in an illustrated manner. The first and the second quarter wavelength plates 27a and 27b and the wavelength conversion element 26 may be referred to as optical function elements.

Figure 1:
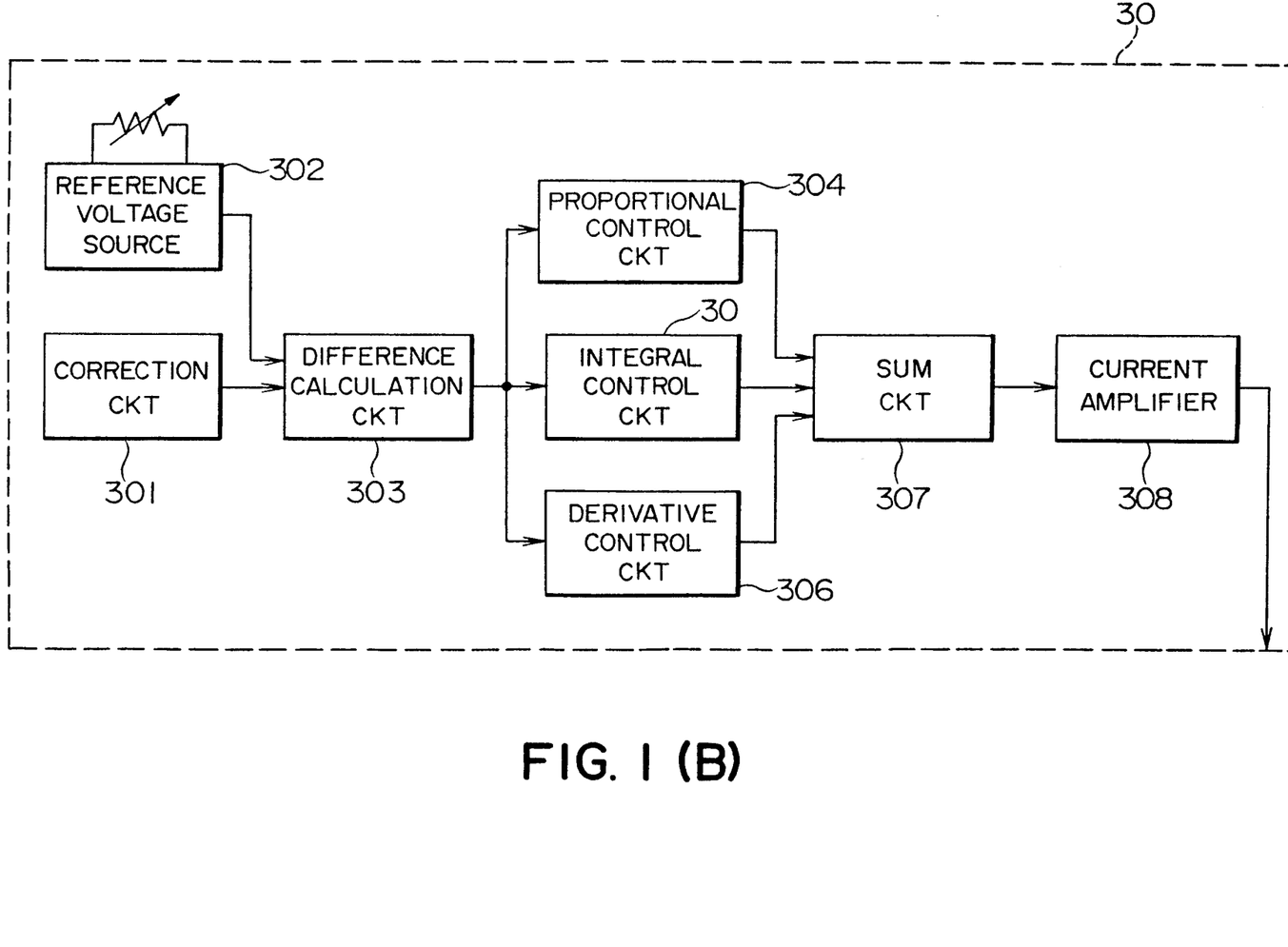

Like in FIGS. 1 through 3, the thermistor 31 is embedded in the cylindrical thermal conductive support 18a and is electrically connected to the temperature controller 30. The temperature controller 30 controls the Peltier effect element 17 to keep the same at a predetermined temperature in the manner mentioned in conjunction with FIG. 1(B). Consequently, the solid-state laser medium 20 and the laser resonator are kept substantially constant in temperature. This means that the output laser beam Lo is stabilized in its level regardless of a variation of an ambient temperature.

As a result of the inventor's experiments, it has been confirmed that the solid-state laser device illustrated in FIG. 4 has effects similar to those illustrated in FIGS. 1 through 3.

Figure 5:
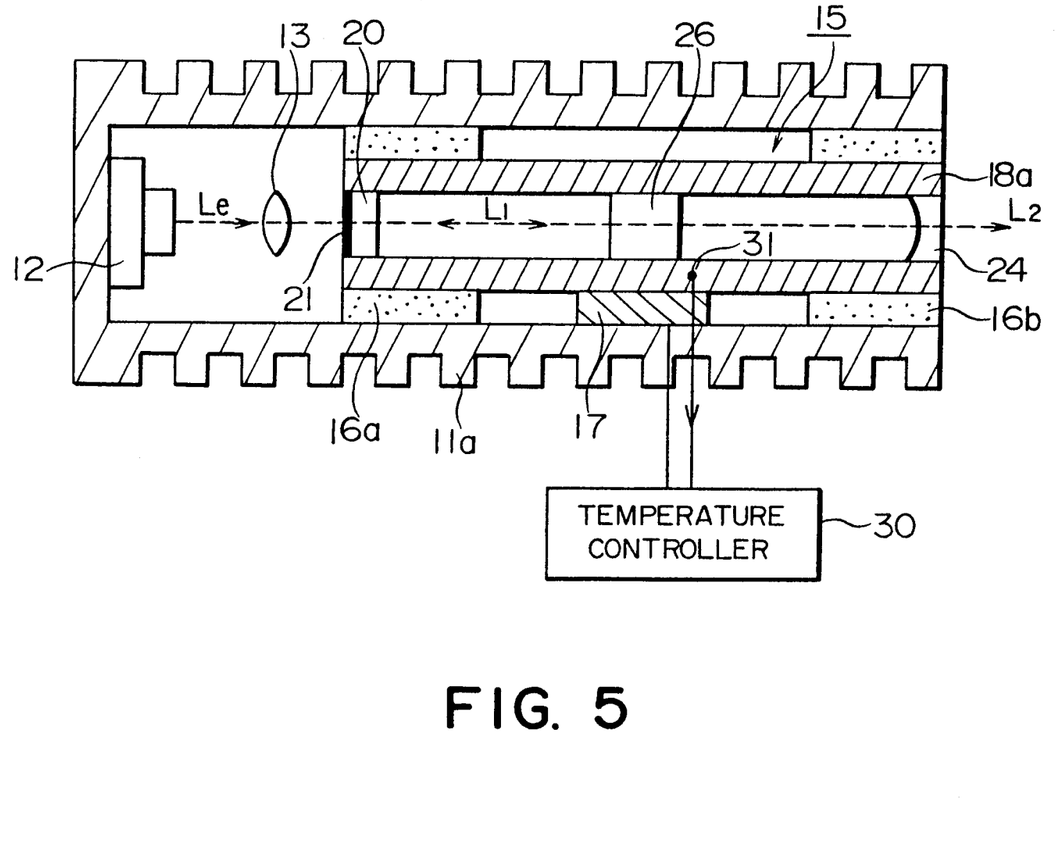
FIG. 5 shows a similar view of a solid-state laser device according to a fifth embodiment of this invention.

Referring to FIG. 5, a solid-state laser device according to a fifth embodiment of this invention is similar in structure to that illustrated in FIG. 4 except that the first and the second quarter wavelength plates 27a and 27b are removed from FIG. 5 and the wavelength conversion element 26 alone is located between the solid-state laser medium 20 and the output mirror 24 in the space defined by the cylindrical thermal conductive support 18a. The wavelength conversion element 26 may be a KTP crystal like in FIG. 4. In this connection, the dielectric multi-layer 21 is coated on the solid-state laser medium 20 like in FIG. 1 to constitute a laser resonator in combination with the output mirror 24. At any rate, temperature control of the solid-state laser medium 20 and the laser resonator is carried out in the manner illustrated in conjunction with FIG. 4 by the use of the thermistor 31, the temperature controller 30, and the Peltier effect element 17.

More specifically, the illustrated solid-state laser device is effective to emit a green laser beam of 532 nm as the output laser beam Lo. To this end, an Nd:YVO$_4$ rod laser is used as the solid-state laser medium 20 and has an area of three millimeter square, a thickness of 1 millimeter, and the first and the second end surfaces subjected to a mirror finish. The dielectric multi-layer 21 is deposited on the first end surface of the solid-state laser medium 20 while an antireflection layer is coated on the second end surface of the solid-state laser medium 20 like in FIG. 4.

The solid-state laser device has obtained optical characteristics similar to those illustrated in conjunction with FIGS. 1 through 4 and could stably emit the green laser beam as the output laser beam Lo without depending on an ambient temperature.

Figure 6:
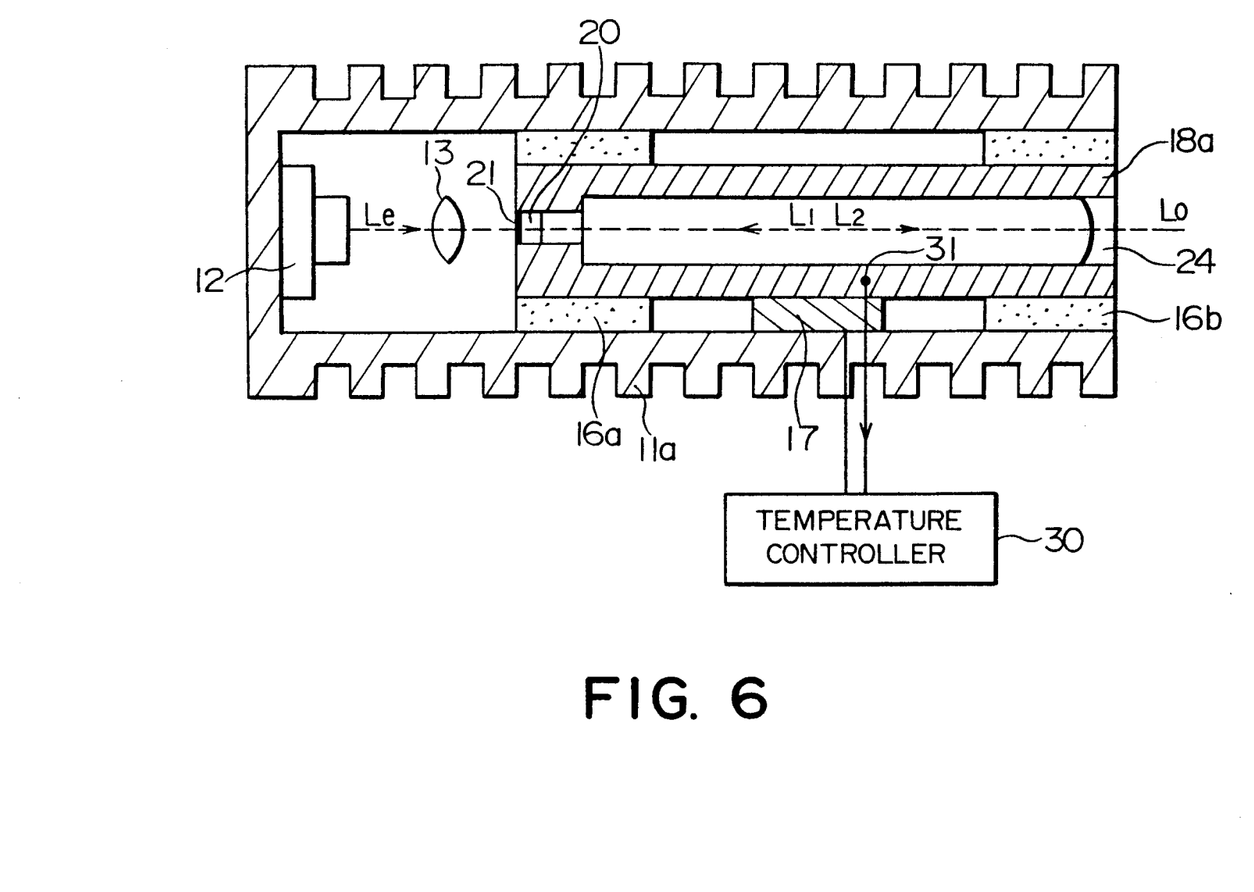
FIG. 6 shows a similar view of a solid-state laser device according to a sixth embodiment of this invention.

Referring to FIG. 6, a solid-state laser device according to a sixth embodiment of this invention is similar in structure to that illustrated in FIG. 5 except that the wavelength conversion element 26 of FIG. 5 is omitted from FIG. 6. In this connection, a NYAB crystal is used as the solid-state laser medium 20 and is directly opposite to the output mirror 24 within the space defined by the thermal conductive support 18a, as illustrated in FIG. 6. As known in the art, the NYAB crystal serves to concurrently oscillate, as the oscillation laser beams, a primary laser beam L1 of a fundamental wavelength (=1062 nm) and a secondary laser beam L2 of a second harmonic wavelength (=531 nm). This shows that the NYAB crystal acts not only as the solid-state laser medium but also as the optical function element.

The illustrated NYAB crystal has an area of 3 millimeter square, and thickness of 0.5 millimeter. Like in FIGS. 1 through 6, the NYAB crystal has the first and the second end surfaces subjected to a mirror finish to make them parallel to each other and the side surface contiguous to the first and the second end surfaces.

The dielectric multi-layer 21 is deposited on the first end surface of the solid-state laser medium 20 as a selective reflection layer and forms the laser resonator in combination with the output mirror 24. The dielectric multi-layer 21 has a reflectance not lower than 99.9% for their fundamental wavelength and another reflectance not lower than 90% for the second harmonic wavelength. In addition, the dielectric multi-layer 21 exhibits a transmittance similar to that illustrated in FIGS. 1 through 5. Such a dielectric multi-layer 21 can be readily deposited in a known manner. On the other hand, the antireflection layer is coated on the second end surface of the NYAB crystal and exhibits, for the primary and the secondary laser beams, reflectances lower than 0.5%.

The output mirror 24 exhibits a reflectance not lower than 99.9% for the primary laser beam L1 of 1062 nm and a reflectance of 75% for the secondary laser beam L2 of 531 nm. The output mirror 24 has a concave surface which is directed to the NYAB crystal and which has a radius of curvature of 100 millimeters. A distance between the dielectric multi-layer 21 and the output mirror 24 is equal to 0.7 millimeters and defines a resonator length.

With this structure, it has been possible to emit the green laser beam of 20 milliwatts and an RMS noise smaller than 3% when the output stability is specified by the RMS noise. As a result, it has been found out that the green laser beam of the longitudinal and the transverse modes can be kept invariable even when and ambient temperature is varied.

While this invention has thus far been described in conjunction with several embodiments thereof, it will readily be possible for those skilled in the art to put this invention into practice in various other manners. For example, the solid-state laser medium may be formed, for example, by Nd:GGG, Nd:YSGG, NAB, NPP, LNP, Er:YAB, Er:YLF, Er:glass, or the like. The wavelength conversion element may be composed, for example, of LiNbO$_3$, BBO, LBO, or the like.

What is claimed is:

1. A solid-state laser device for use in emitting an output laser beam by pumping a solid-state laser medium in a laser resonator by an excitation laser beam generated from a semiconductor laser unit, said solid-state laser device comprising:

a thermal conductive support which supports both of the solid-state laser medium and the laser resonator; and temperature control means electrically connected to said thermal conductive support for controlling a temperature of said thermal conductive support to keep said thermal conductive support at a predetermined temperature and to stabilize oscillation of said solid-state laser medium.

2. A solid-state laser device as claimed in claim 1, wherein said temperature control means comprises:

a temperature detector attached to said thermal conductive support for detecting said temperature of the thermal conductive support to produce a temperature detection signal representative of the temperature of the thermal conductive support;

a temperature controller for controlling the temperature of the thermal conductive support in response to said temperature detection signal to adjust said temperature of the thermal conductive support to said predetermined temperature.

3. A solid-state laser device as claimed in claim 1, wherein said temperature control means comprises:

memory means for memorizing said predetermined temperature at which said solid-state laser medium can stably oscillate said output laser beam; and driving means responsive to said temperature detection signal and coupled to said memory means for driving said thermal conductive support to keep said thermal conductive support at the predetermined temperature so that said temperature of the thermal conductive support is coincident with said predetermined temperature.

4. A solid-state laser device as claimed in claim 3, wherein said driving means is structured by a Peltier effect element.

5. A solid-state laser device as claimed in claim 1, wherein said thermal conductive support is formed by a thermal conductive plate.

6. A solid-state laser device as claimed in claim 1, wherein said thermal conductive support is formed by a thermal conductive cylindrical member which surrounds a hollow space therein.

7. A solid-state laser device as claimed in claim 1, said solid-state laser device further comprising an optical function element which has a predetermined optical characteristic, wherein said optical function element is mounted on said thermal conductive support together with said solid-state laser medium and said laser resonator.

* * * * *